United States Patent
Eschke et al.

(10) Patent No.: US 6,721,236 B1
(45) Date of Patent: Apr. 13, 2004

(54) RADIO RECEIVER HAVING A HARD DISK DRIVE

(75) Inventors: Bernd Eschke, Bad Salzdetfurth (DE); Hans-Juergen Fischer, Hildesheim (DE); Peter Geiselhart, Hildesheim (DE); Joachim Wietzke, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/530,029

(22) PCT Filed: Oct. 22, 1998

(86) PCT No.: PCT/DE98/03083

§ 371 (c)(1),
(2), (4) Date: Jul. 19, 2000

(87) PCT Pub. No.: WO99/21306

PCT Pub. Date: Apr. 29, 1999

(30) Foreign Application Priority Data

Oct. 22, 1997 (DE) .......................... 197 46 597

(51) Int. Cl.$^7$ ................................. H04B 1/20
(52) U.S. Cl. ........................... 369/6; 455/345
(58) Field of Search ................ 369/6, 7, 1, 2, 369/10, 11, 12; 701/1, 36; 455/345, 346, 3.06

(56) References Cited

U.S. PATENT DOCUMENTS

| | | | | |
|---|---|---|---|---|
| 5,561,849 A | * | 10/1996 | Mankovitz | 455/45 |
| 5,671,195 A | * | 9/1997 | Lee | 369/7 |
| 5,732,324 A | * | 3/1998 | Rieger, III | 455/3.1 |
| 5,794,164 A | * | 8/1998 | Beckert et al. | 455/456 |
| 6,163,508 A | * | 12/2000 | Kim et al. | 369/7 |
| 6,185,163 B1 | * | 2/2001 | Bickford et al. | 369/32 |
| 6,332,175 B1 | * | 12/2001 | Birrell et al. | 369/33 |

FOREIGN PATENT DOCUMENTS

| | | | |
|---|---|---|---|
| DE | 38 05 810 | 9/1989 | |
| DE | 42 18 804 | 12/1993 | |
| DE | 198 03 253 | 8/1998 | |
| EP | 0 453 108 | 10/1991 | |
| EP | 0 702 210 | 3/1996 | |
| WO | 97/19833 | * 6/1997 | 369/6 |

* cited by examiner

*Primary Examiner*—Tan Dinh
(74) *Attorney, Agent, or Firm*—Kenyon & Kenyon

(57) ABSTRACT

A radio receiver for use in a vehicle, the radio receiver including a hard-disk drive having a hard disk, on which data can be stored in a non-volatile manner on storage locations of the hard disk, and a write-read memory so that data stored on the hard disk can be transferred into the write-read memory and can be displayed on a display device.

10 Claims, 1 Drawing Sheet

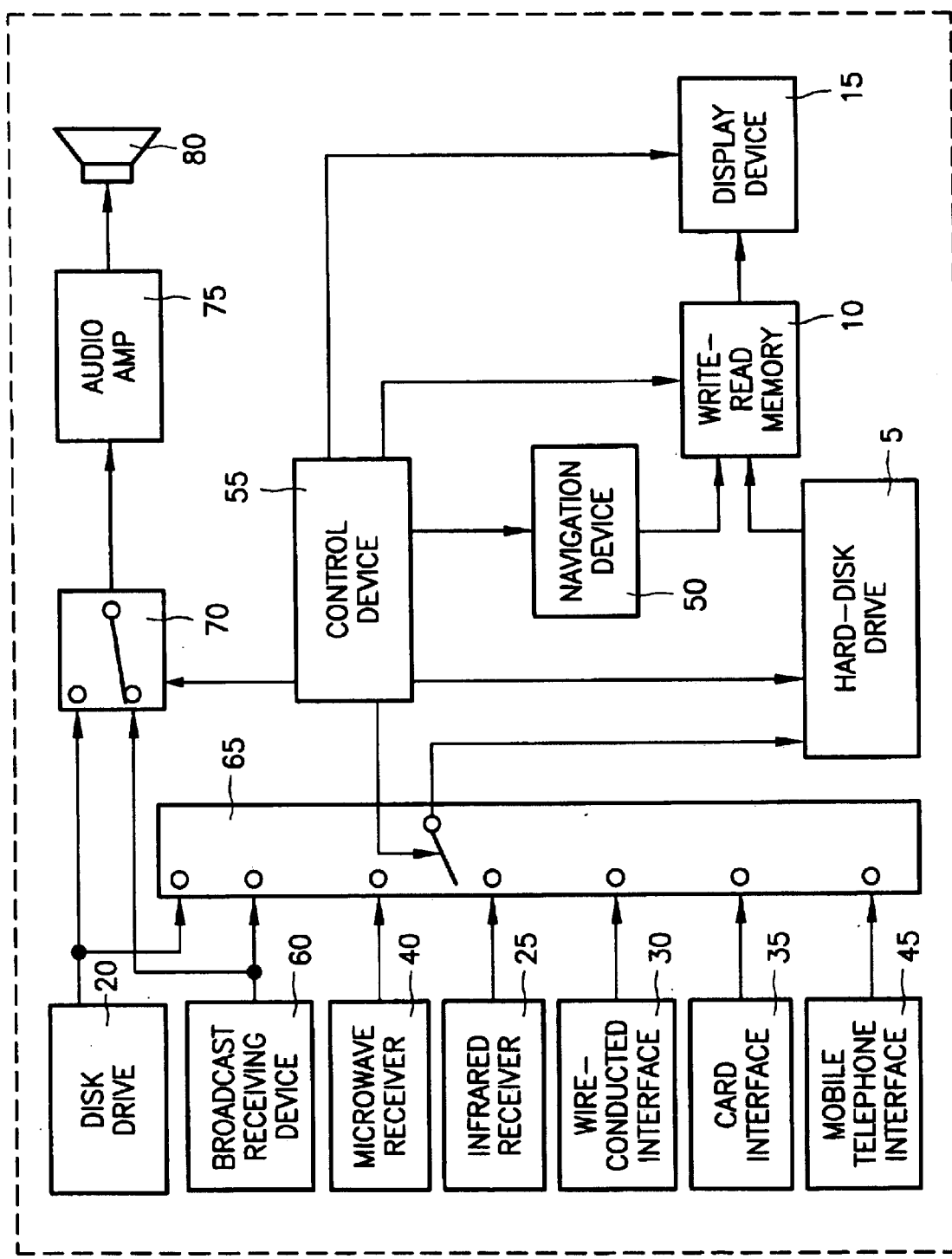

RADIO RECEIVER HAVING A HARD DISK DRIVE

FIELD OF THE INVENTION

The present invention relates to a radio (broadcast) receiver.

BACKGROUND INFORMATION

These are car radios, designed as radio receivers, are already known which can be combined with a navigation computer. This is the case, for example, with the Blaupunkt car radio "Berlin RCM303-A". In that case, the navigation computer includes a CD-ROM disk drive. By inserting a CD-ROM into the CD-ROM disk drive, maps in the form of navigation data can thus be loaded from the CD-ROM into the navigation computer.

European Patent 0 453 108 describes a disk player for an audio disk and a memory disk which can be installed as a navigation system in a vehicle. The navigation system includes a so-called CD-ROM, upon which map data are stored. This system reads map data of the desired map from the CD-ROM and supplies the data as a display information signal to a display device. This results in a display of the map on the display device, so that a user is able to determine the present position of the vehicle. Since the CD-ROM as a medium for storing map data has the same signal format as a compact disk, both an audio disk and a CD-ROM can be played by the disk player.

SUMMARY OF THE INVENTION

In contrast, the radio receiver of an exemplary embodiment of the present invention has the advantage that, by installing a hard disk, data can be stored in a non-volatile manner on storage locations of the hard disk. Thus, it is believed that it is not necessary to supply such data to the radio receiver with the aid of external storage media such as storage disks constructed as CD-ROM's, thus considerably increasing the ease of control for the user. In addition, traffic safety may be increased, since the user is not distracted from traffic by inserting an external storage medium into the radio receiver. Furthermore, no input compartment for an external storage medium is necessary on the operating front of the radio receiver, so that space is saved on this operating front and functional clarity for the user is increased. Another advantage is that such a hard disk represents an inexpensive non-volatile mass storage with write and erase capability for any present and even future applications and supplementary services with corresponding storage requirement.

A further advantage is that a drive for a disk-shaped optical recording medium is provided, and that storage locations on the hard disk can be overwritten with data from a storage disk inserted into the drive. Thus, data stored on the hard disk can be updated in a particularly simple manner with the aid of data saved on a storage disk inserted into the drive. In addition, the drive can also be used for accommodating audio or video disks provided for playback, thus increasing the functionality of the drive. Naturally, this assumes appropriate data-processing and playback devices in the radio receiver.

It is also advantageous that, because of the hard disk disposed in the radio receiver, it is not necessary to reload data during the operation of the radio receiver or when playing an audio or video disk in the drive, since a storage disk does not have to be inserted into the drive for this purpose. The insertion of a storage disk is used here only for updating the data stored on the hard disk, so that an access of the radio receiver to data of the storage disk is otherwise not necessary for special applications and supplementary services. Thus, given the construction of the radio receiver as a car radio, it is also not necessary to remove an audio or video disk from the drive in order to insert into the drive a storage disk as a database for special applications or supplementary services except for updating the database on the hard disk, so that the driver is also not distracted from traffic. Likewise, it is not necessary to provide a second drive for the storage disk on the radio receiver, thus saving space and increasing the functional clarity of the radio-receiver operating panel.

These are a number of measures by which storage locations on the hard disk can be overwritten or updated. In this context, data received via radio broadcasting, via an infrared interface, via a wire-conducted interface, via a card interface having a card reader and an input compartment for an access-authorization card, via a microwave receiver and/or a mobile telephone interface for a mobile telephone connected to or integrated into the radio receiver, can be stored on the hard disk. This permits automatic, continuous optimization and updating of the database stored on the hard disk which requires no operator control on the part of the user and represents considerably increased ease of control for the user.

A further advantage is that a navigation device is provided, and that navigation data can be stored on storage locations of the hard disk. Thus, it is not necessary to reload navigation data from a storage disk, which makes it possible to dispense with a separate drive for such a storage disk, or in the case of co-application of a drive for audio or video disks, it is not necessary to interrupt the playing of an inserted audio or video disk in order to reload navigation data from a storage disk.

Another advantage is that additional information data, particularly weather data, schedule data and telephone-directory data, can be stored on storage locations of the hard disk. In this manner, the hard disk can be used for storing different types of data for various applications and supplementary services, so that the functionality of the hard disk is increased.

BRIEF DESCRIPTION OF THE DRAWING

The FIGURE shows a block diagram of a radio receiver according to an exemplary embodiment of the present invention.

DETAILED DESCRIPTION

In the FIGURE a radio receiver 1 is constructed as a car radio (automotive sound system). Car radio 1 includes a disk drive 20 for a disk-shaped optical recording medium which can be constructed as an audio disk, a video disk or as a storage disk. For example, an audio disk can be a compact disk, a video disk can be a digital video disk, and the storage disk can be a CD-ROM. Car radio 1 also includes a broadcast receiving arrangement, device or part 60, a microwave receiver 40, an infrared interface 25 designed as an infrared receiver, a wire-conducted interface 30, a card interface 35 having a card reader and an input compartment for an access-authorization card, and a mobile telephone interface 45 for a mobile telephone connected to or integrated into car radio 1. Disk drive 20, broadcast receiving part 60, microwave receiver 40, infrared receiver 25, wire-conducted interface 30, card interface 35 and mobile telephone interface 45 are connectible via a changeover switch 65 to a hard-disk drive 5 in which a hard disk is disposed. In addition, disk drive 20 and broadcast receiving part 60 are connectible via a switch 70 to an audio amplifier 75 which is connected to a loudspeaker 80. A monitor necessary for the video playback of a video disk inserted into disk drive 20 is not shown in the FIGURE. Car radio 1 also includes a write-read memory 10 that is connected to hard-disk drive 5 and linked to a display device 15. Car radio 1 further includes a navigation device 50 which is likewise connected to write-read memory 10. Changeover switch 65, switch 70, hard-disk drive 5, navigation device 50, write-read memory 10 and display device 15 are controlled by a control device 55.

For example, before delivering car radio 1 to the user, a first initialization of the hard disk in hard-disk drive 5 is carried out with the aid of a CD-ROM containing navigation data that is inserted into disk drive 20. To that end, control device 55 causes changeover switch 65 to connect disk drive 20 to hard-disk drive 5. The navigation data can then be copied from the CD-ROM onto the hard disk located in hard-disk drive 5. In this context, the hard disk represents a permanently installed non-volatile mass storage with write and erase capability, e.g., an optical-magnetic storage, a purely optical storage, a purely magnetic storage, an electronic storage or the like.

Using an input command to an input unit (not shown in the FIGURE), the user of car radio 1 can cause control device 55 to load navigation data from the hard disk into write-read memory 10 and, with the aid of navigation device 50, to create a piece of navigation information, displayable on display device 15, from the navigation data in write-read memory 10; this piece of navigation information can then be brought to display, induced by control device 55, on display device 15. At the same time, likewise as a function of a user input to the input unit not shown in the FIGURE, audio data from broadcast receiving part 60 or from an audio or video disk located in disk drive 20 can be routed via switch 70 to audio amplifier 75 for playback via loudspeaker 80. Switch 70 then connects the audio-signal source, which is selected accordingly by the user at the input unit not shown in the FIGURE, to audio amplifier 75. Thus, audio data can be played back by loudspeaker 80 and navigation data can be displayed on display device 15 simultaneously. The navigation database on the hard disk in hard-disk drive 5 can be updated in various ways. On one hand, it can be carried out with the aid of a CD-ROM having updated navigation data that is inserted into disk drive 20. However, for that purpose, an audio or video disk located in disk drive 20 must be removed, making it necessary to interrupt an acoustic playback being carried out at the moment if disk drive 20 is in fact connected via switch 70 to audio amplifier 75. However, if broadcast receiving part 60 is connected at the moment via switch 70 to audio amplifier 75, then it is not necessary to interrupt an acoustic reproduction of the broadcast reception when reloading navigation data from a CD-ROM in disk drive 20.

However, the navigation database on the hard disk in hard-disk drive 5 can also be updated automatically, i.e., without using a storage disk and thus without an operator action on the part of the user. In the event that broadcast receiving part 60 is designed for the reception of digital data via digital radio broadcasting, i.e., via DAB (digital audio broadcast), updated navigation data can also be transmitted digitally via radio broadcasting and received by broadcast receiving part 60. By connecting broadcast receiving part 60 to hard-disk drive 5 via changeover switch 65 that is appropriately controlled by control device 55, the navigation data received via radio broadcasting can then be stored on storage locations of the hard disk, thus updating the navigation database on the hard disk. Radio reception of navigation data for updating the navigation database on the hard disk is also possible, for example, via the radio data system RDS in a special channel, e.g., the traffic message channel (TMC). However, navigation data can also be transmitted in any other manner, digital or analog, to broadcast receiving part 60, it being necessary to carry out an analog-digital conversion of the transmitted navigation data in the case of an analog transmission before routing the navigation data to the hard disk in hard-disk drive 5.

Updating navigation data via radio broadcasting has the advantage that a large-area data distribution is possible to many receivers at the same time.

Another possibility for automatically updating the navigation database on the hard disk can be effected via infrared receiver 25. Using a personal computer or laptop having an infrared interface constructed as an infrared transmitter, the navigation database on the hard disk can be updated by remote control, e.g., when servicing the vehicle or by the user him/herself, it being necessary for this case that infrared receiver 25 be connected by control device 55 via changeover switch 65 to hard-disk drive 5.

Navigation data are then transmitted from the personal computer or laptop having the infrared transmitter, via infrared receiver 25, to the hard disk in hard-disk drive 5, and are stored there on storage locations.

A further possibility for updating the navigation database on the hard disk is to connect a computer such as a personal computer or a laptop to wire-conducted interface 30, and from there to transmit navigation data via wire-conducted interface 30 to the hard disk in hard-disk drive 5 and to store it there. For that purpose, wire-conducted interface 30 must be connected by control device 55 via changeover switch 65 to hard-disk drive 5. The navigation data is then transmitted from the connected computer via wire-conducted interface 30 to the hard disk and is stored there on storage locations. For example, this can likewise be done when servicing the vehicle or by the user him/herself.

Another possibility for updating the navigation database on the hard disk is to transmit navigation data to the hard disk via card interface 35 and changeover switch 65 that is appropriately adjusted by control device 55. To that end, an access-authorization card for car radio 1 can be loaded at a computer, e.g., a personal computer or a laptop having an input compartment and a card reader, with navigation data from the computer. The access-authorization card is subsequently inserted by the user or by a person servicing the vehicle into the card-input compartment of car radio 1 and is read by the card reader of car radio 1. The navigation data is then transferred to the hard disk in hard-disk drive 5 and is stored there on storage locations.

A further possibility for updating the navigation database on the hard disk in hard-disk drive 5 can also be carried out such that changeover switch 65, induced by control device 55, connects microwave receiver 40 to hard-disk drive 5, so that navigation data, emitted and transmitted, for example, from special transmitting installations at city entrances via so-called short range communication such as DSRC (dedicated short range communication), are transferred from microwave receiver 40 to the hard disk and are stored there on storage locations.

Another possibility for updating the navigation database on the hard disk is that control device 55 connects mobile telephone interface 45 to hard-disk drive 5 via changeover switch 65, so that navigation data transmitted via a telephone network to the mobile telephone integrated into or connected to car radio 1 can be routed to the hard disk in hard-disk drive 5 and stored there on storage locations.

Apart from the updating of the navigation database on the hard disk, initialization of the navigation database, i.e., a first initialization of the navigation database on the hard disk, can also be carried out via broadcast receiving part 60, microwave receiver 40, infrared receiver 25, wire-conducted interface 30, card interface 35 and mobile telephone interface 45 in the manner described above. The difference with respect to the updating then lies merely in the fact that the storage content of the hard disk is undefined at the time of the first initialization.

By the cyclic successive connection of individual interfaces 20, 25, 30, 35, 40, 45, 60 to hard-disk drive 5 for updating or initializing the navigation database, control device 55 can ensure that the most current navigation data are always stored on the hard disk, regardless of the transmission path of the navigation data, so that continuous optimization or updating of the navigation database on the hard disk is possible and navigation is always carried out using current data.

In this manner, an up-to-date navigation database is always available in a non-volatile manner in car radio 1.

Non-volatile data storage on the hard disk can also be utilized for other purposes in which preferably larger amounts of data must be stored, e.g., for additional information data such as weather data, schedule data, telephone-directory data, video data and the like.

The installation of the hard disk and hard-disk drive 5 makes disk drive 20 usable exclusively for audio or video playback when driving, accompanied by simultaneous navigation. A change of the audio or video disk to update the navigation database on the hard disk with the assistance of a storage disk constructed, for example, as a CD-ROM, in disk drive 20 is not necessary.

In this context, the additional information data is stored or initialized and updated on storage locations of the hard disk in the same manner as the navigation data. Thus, an up-to-date database is always available on the hard disk for the navigation and additional information.

The additional information data is likewise loaded, as a function of an input command input by the user at the input unit (not shown in the FIGURE), by control device 55 from the hard disk into write-read memory 10 for display on display device 15, this displaying likewise being caused by control device 55. Moreover, this input unit can include operating control elements, for example, in order to call for additional information data or navigation information.

Due to the hard disk, an economical, non-volatile mass storage having write and erase capability is available for present and future applications and supplementary services.

What is claimed is:

1. A radio receiver for use in a vehicle, the radio receiver comprising:
   a hard-disk drive having a hard disk, the hard disk having storage locations that are non-volatile for storing data, the hard-disk drive being integrated into the radio receiver;
   a write-read memory for storing the data that is transferred from the hard disk into the write-read memory;
   a wireless receiver configured to wirelessly receive updated navigation data, the received updated navigation data being stored in the storage locations of the hard-disk drive;
   a navigation device configured to provide navigation information based on the updated navigation data stored on the hard-disk; and
   a display device for displaying at least a part of the data that is transferred from the hard disk into the write-read memory, the navigation device further configured to display the navigation information on the display device.

2. The radio receiver of claim 1, further comprising:
   a disk drive for use with a storage disk having an optical recording medium and being insertable into the disk drive; and
   means for overwriting the storage locations of the hard disk with another data from the storage disk, the storage disk being inserted in the disk drive.

3. The radio receiver of claim 1, wherein the wireless receiver is a broadcast receiving arrangement.

4. The radio receiver of claim 1, wherein the wireless receiver includes an infrared interface, the wireless receiver configured to receive the updated navigation data via the infrared interface.

5. The radio receiver of claim 1, further comprising:
   at least one of a wire-conducted interface and a connected computer; and
   means for overwriting the storage locations of the hard disk with another data received via the at least one of the wire-conducted interface and the connected computer.

6. The radio receiver of claim 1, further comprising:
   a card interface having a card reader and an input compartment for use with an access-authorization card; and
   means for overwriting the storage locations of the hard disk with another data received via the card reader from the access-authorization card, the access-authorization card being inserted in the input compartment.

7. The radio receiver of claim 1, wherein the wireless receiver is a microwave receiver.

8. The radio receiver of claim 1, wherein the wireless receiver includes a mobile telephone interface for a mobile telephone, the navigation data being received via the mobile telephone interface.

9. The radio receiver of claim 1, further comprising a control device for loading information data stored at the storage locations of the hard disk the write-read memory for display on the display device, wherein the information data include at least one of weather data, schedule data and telephone-directory data.

10. The radio receiver of claim 1, further comprising:
    an input unit for receiving an input command; and
    a control device for loading at least a part of the data from the storage locations of the hard disk into the write-read memory as a function of the input command and for causing a display on the display device as a function of the at least part of the data.

* * * * *